United States Patent [19]
Campbell

[11] 3,768,730
[45] Oct. 30, 1973

[54] FUEL PRE-HEATER
[75] Inventor: James L. Campbell, Santa Barbara, Calif.
[73] Assignee: Internation Research Corporation, Ann Arbor, Mich.
[22] Filed: Apr. 29, 1971
[21] Appl. No.: 138,622

[52] U.S. Cl.................. 236/93, 123/122 E, 165/40
[51] Int. Cl............................................ F02m 31/16
[58] Field of Search................................. 236/1, 93; 165/40; 123/122 E

[56] References Cited
UNITED STATES PATENTS
2,334,679  11/1943  Mason et al. ........................ 431/12
2,881,828  4/1959  McGinnis ....................... 123/122 E
3,472,214  10/1969  Moon ............................. 123/122 E Primary Examiner—William E. Wayner
Attorney—Jacobs & Jacobs

[57] ABSTRACT

A device for supplying pre-heated fuel to an engine is constructed which comprises means for conveying hot fuel which is not consumed in the engine into a primary fuel tank, means for mixing fuel already in the tank with the hot fuel and means for conveying the mixed fuel out of the tank to the engine. The device includes a thermostatically controlled valve arrangement whereby when the temperature of the fuel in the fuel tank is such that the hot fuel returned from the engine is not needed in order to maintain a fuel temperature of fuel being supplied to the engine of about 90° F., the return hot fuel may either be bypassed into the supply of fuel in the primary tank or may be bypassed into a secondary fuel tank.

4 Claims, 4 Drawing Figures

PATENTED OCT 30 1973 3,768,730
FIG.1
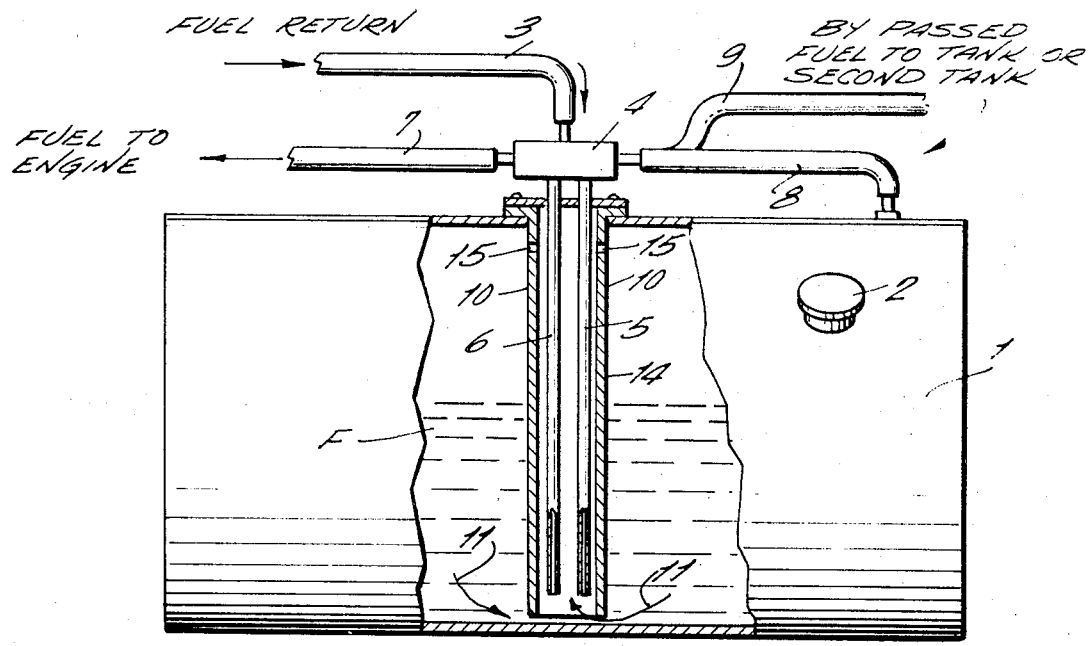
FUEL RETURN 3
BY PASSED FUEL TO TANK OR SECOND TANK 9
FUEL TO ENGINE 7
4
8
15 10 5 6 14
2
F
11 11
1
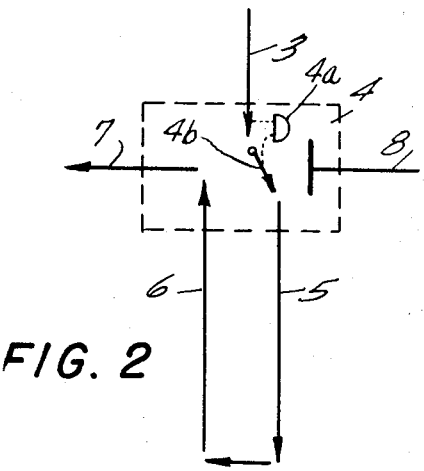
FIG. 2
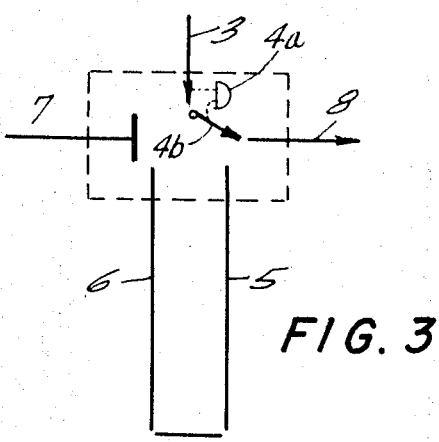
FIG. 3
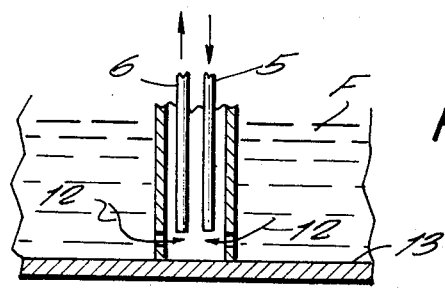
FIG. 4
INVENTOR.
JAMES L. CAMPBELL
BY Jacobs & Jacobs
ATTORNEYS

FUEL PRE-HEATER

The present invention is concerned with a device for supplying pre-heated fuel to an engine and to a method whereby fuel is pre-heated and supplied to an engine. The present invention may be used in a system having one or more fuel tanks.

More particularly, the present invention is designed for use with engines having a fuel by-pass mechanism wherein fuel which is not consumed by the engine may be returned to one or more fuel tanks. The present device utilizes the heat of the by-passed fuel to obtain and maintain a more stable fuel temperature for the fuel supply which is being carried to the engine for combustion and such has particular advantages for cold weather operating conditions.

While the present invention is applicable to a wide range of fuel consuming engines, one particular advantage lies in the use of the device on diesel fuel vehicles although gasoline fuel vehicles may derive similar advantages therefrom.

Diesel fuel in particular often presents problems in cold weather operations due to waxing, clouding and the formation of water crystals in the fuel lines, as well as changes in fuel viscosity due to extremely cold temperatures. By maintaining the fuel supplied to the engine at a predetermined temperature, these problems are overcome and increased efficiency and combustion results.

The present invention may be more particularly and clearly understood by reference to the drawings wherein:

FIG. 1 is a side sectional view of a fuel tank containing the fuel pre-heating device according to the present invention;

FIG. 2 shows diagrammatically the operation of the thermostatically controlled valve whereby hot fuel is returned from the engine into the primary fuel tank;

FIG. 3 shows operation of the thermostatically controlled valve so that the hot fuel is by-passed either to be separately inletted into the fuel tank or by-passed to a secondary fuel tank; and FIG. 4 shows a modification of the means by which fuel from the tank is mixed with the return hot fuel.

More particularly with regard to the drawings, FIG. 1 shows a primary fuel tank 1 having a filling cap 2 through which the tank is normally filled with fuel. The hot fuel return from the engine is designated as means 3 and it shows a section of the fuel return which conveys the hot fuel which has not been consumed by the engine into thermostatically controlled valve 4. Valve 4 has sensing member 4a to sense the temperature of fuel in line 3 and movable member 4b, which is moved between inlet member 5 and by-pass means 8,9 depending upon the temperature of fuel in line 3. FIGS. 2 and 3 show diagrammatically the operation of valve 4. When the hot fuel is directed into the primary fuel tank, it passes through valve 4 and into inlet member 5 which extends into the gas tank encased by housing 10. Housing 10 has spacing 11 between the bottom of housing 10 and bottom 13 of primary fuel tank 1. This spacing 11 allows fuel from the tank to be drawn in and mixed with the hot return fuel as it passes through the fuel tank through inlet member 5 and out outlet member 6, and consequently out 7 which is the means for conveying the mixed fuel to the engine for combustion. It is to be appreciated that in the operation of this device, various modifications can be made, representative modifications of which are illustrated in the drawings. Thus as shown in FIG. 4, housing 10 can extend to the bottom 13 of primary fuel tank 1 and have holes 12 disposed through the surface thereof in order to permit fuel from the tank to be drawn in and mixed with the hot fuel. In addition as shown in FIGS. 1 and 3, when the temperature of the fuel being conveyed to the engine via means 7 is such that the returned hot fuel is not required in order to maintain such fuel conveyed to the engine at a temperature of about 90° F., the returned hot fuel then passes through valve 4 as shown in FIG. 3 and passes along either by-pass means 8 or by-pass means 9. By-pass means 8 conveys the returned hot fuel into the primary tank but permits it to mix with the fuel in the tank rather than drawing fuel from the tank to be mixed with the hot fuel. Alternatively by by-pass means 9, the returned hot fuel may be conveyed to a secondary tank in order to raise the temperature of the fuel disposed in said secondary tank.

It is to be appreciated that when the hot returned fuel is by-passed either by means of by-pass 8 or 9 through the use of valve 4, that the fuel F within primary fuel tank 1 is then supplied directly to the engine by being drawn through spacing 11 or holes 12 and conveyed up outlet member 6 through conveying means 7 to the engine. Housing 10 is provided with vent holes 15 to permit proper ventilation and bleed off any excess air. It is also to be appreciated that the fuel tank 1 may be of any desired configuration and may be located at any convenient point.

Other and further uses will be more fully appreciated by those skilled in the art by reference to the above disclosure, the drawings and the claims appended hereto.

What is claimed is:

1. Apparatus for supplying preheated fuel to an engine, which comprises a fuel tank having an inlet and an outlet, supply means for conveying hot fuel not consumed by the engine to said inlet, first vertically extending conduit means communicating with said inlet and extending from the inlet to the bottom of the tank, second vertically extending conduit means communicating with said outlet and extending from the outlet to the bottom of the tank, a vertically extending housing in said tank surrounding said first and second conduit means, said housing having opening means for establishing communication between fuel in said tank and the interior of the housing, said housing constituting means for mixing fuel in said tank with hot fuel delivered by said first conduit means to thereby form a preheated fuel mixture, means for conveying preheated fuel from said outlet to said engine, by-pass means connected to said supply means for conveying said hot fuel directly to said tank at a location remote from said inlet, and thermostatic valve means connected to said supply means and said by-pass means for controlling the flow of said hot fuel solely to said inlet when the temperature of the fuel in the fuel tank is below a predetermined temperature and solely to said by-pass means when said temperature reaches said predetermined temperature.

2. A device according to claim 1 comprising means connected to said by-pass means for by-passing said hot fuel to a secondary tank.

3. A device according to claim 1 wherein said housing extends to just short of the bottom of said fuel tank and said opening means comprises a spacing between the bottom of the housing and the bottom of the fuel tank.

4. A device according to claim 1 wherein said housing extends to the bottom of the fuel tank and said opening means comprises at least two holes in the housing adjacent the bottom thereof.

* * * * *